United States Patent [19]

Furuta

[11] 4,417,445

[45] Nov. 29, 1983

[54] BRAKE MASTER CYLINDER WITH ATTACHED BRAKE BOOSTER

[75] Inventor: Youichi Furuta, Gifu, Japan

[73] Assignee: Aisin Seiki Kabushiki Kaisha, Kariya, Japan

[21] Appl. No.: 309,084

[22] Filed: Oct. 6, 1981

Related U.S. Application Data

[63] Continuation of Ser. No. 69,518, Aug. 23, 1979, abandoned.

[30] Foreign Application Priority Data

Aug. 26, 1978 [JP] Japan ............................... 53-117141

[51] Int. Cl.³ ............................................ B60T 13/20
[52] U.S. Cl. ........................................ 60/554; 60/578; 60/588; 91/369 A
[58] Field of Search ................ 60/550, 552, 553, 554, 60/575, 577, 578; 91/369 A; 60/588

[56] References Cited

U.S. PATENT DOCUMENTS

| | | | |
|---|---|---|---|
| 3,662,552 | 5/1972 | Ochiai et al. | 60/562 |
| 3,910,047 | 10/1975 | Grabb | 60/554 |
| 3,911,681 | 10/1975 | Sisco | 60/553 |
| 3,937,021 | 2/1976 | Sisco et al. | 60/575 |
| 3,972,191 | 8/1976 | Grabb | 60/553 |
| 4,033,131 | 7/1977 | Gardner | 60/553 |
| 4,072,014 | 2/1978 | Gardner | 60/575 |

*Primary Examiner*—Abraham Hershkovitz

*Attorney, Agent, or Firm*—Oblon, Fisher, Spivak, McClelland & Maier

[57] ABSTRACT

A brake master cylinder, having a body, with an attached brake booster which includes first and second pneumatic pressure chambers provided in a booster housing, a power piston defining the first and second chamber therebetween, a first valve mechanism provided within the power piston and generating a pressure difference between the first and second chambers in response to the operation of an associated brake pedal, first and second hydraulic pressure chambers provided in the master cylinder body, a primary piston disposed in the first hydraulic pressure chamber operably connected to the power piston, a first passage member communicating the second hydraulic pressure chamber with a brake wheel cylinder, a second passage member communicating the first hydraulic pressure chamber with a reservoir, a second valve mechanism controlling the communication between the second passage member and the reservoir upon slidable movement with the primary piston, a third valve mechanism provided within the primary piston and including a pressure relief member, the third valve mechanism controlling communication between the reservoir and the first hydraulic pressure chamber through the pressure relief passage member and a resilient member disposed within the primary piston for controlling opening and closing of the third valve mechanism by generating internal pressure therein in response to operation of the brake pedal.

3 Claims, 1 Drawing Figure

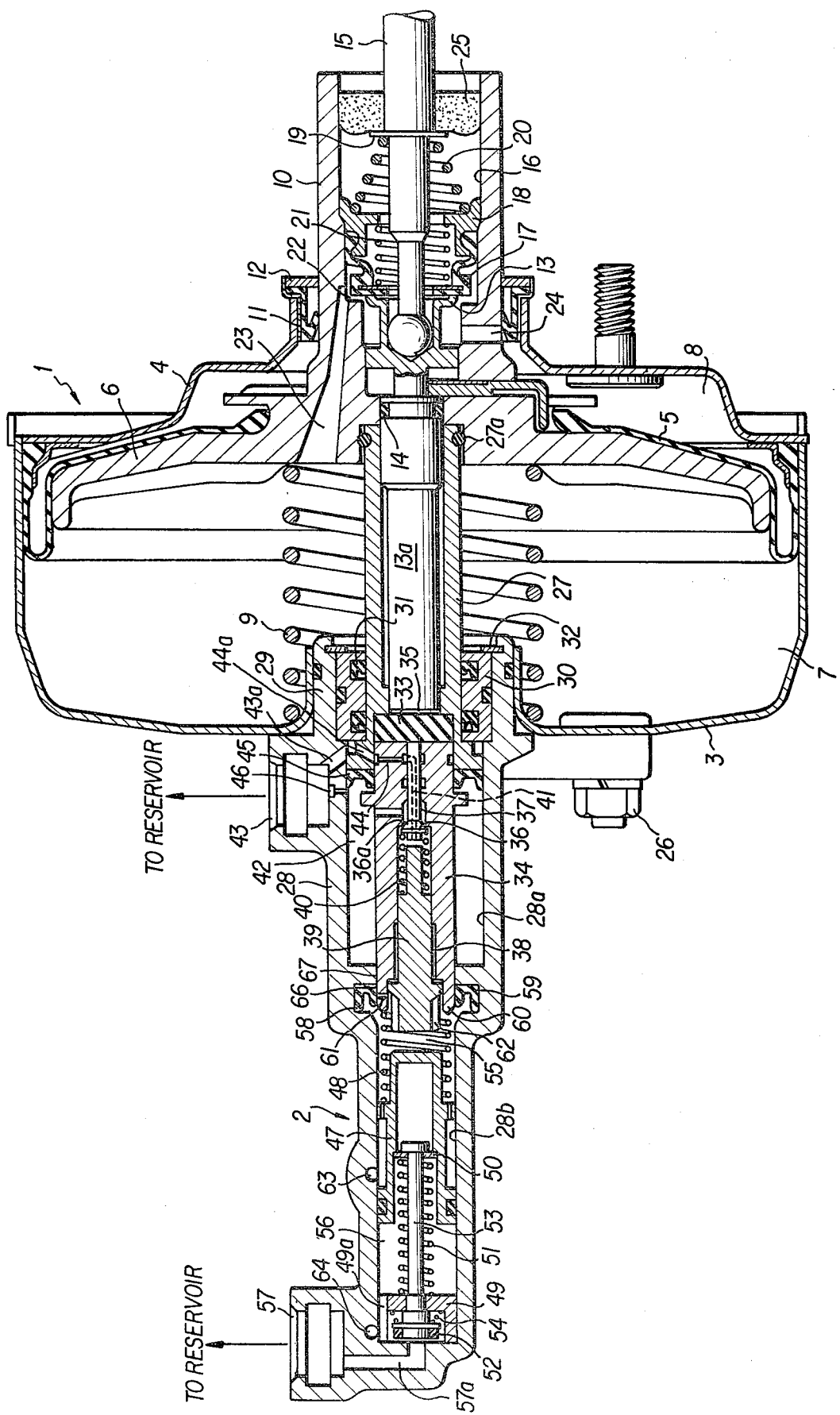

BRAKE MASTER CYLINDER WITH ATTACHED BRAKE BOOSTER

This is a continuation of application Ser. No. 069,518, filed Aug. 23, 1979, now abandoned.

BACKGROUND OF THE INVENTION

Field of the Invention

The present invention relates to a brake master cylinder with a brake booster attached thereto.

SUMMARY OF THE INVENTION

An object of the present invention is to provide a control valve of a master cylinder which is controlled by the internal pressure generated by a compressible rubber-like reaction disc such that the construction thereof may be extremely simplified and yet improve the responsiveness of pedal operation.

A further object of the present invention is to decrease the stroke of the brake pedal while maintaining the same braking effect as found in a conventional brake mechanism which has a somewhat longer pedal stroke.

An additional object of the present invention is to minimize the loss of stroke which might otherwise occur in either one of the brake systems of a conventional brake mechanism.

BRIEF DESCRIPTION OF THE DRAWING

Various other features, objects and attendant advantages of the present invention will become self-evident when considered in connection with the accompanying drawing wherein:

The sole FIGURE discloses the preferred embodiment of the present invention.

DETAILED DESCRIPTION OF THE PREFERRED EMBODIMENT

In the sole FIGURE, reference numeral 1 generally designates a brake booster, one end of which is operatively connected to a brake master cylinder 2. The brake booster 1 has a front housing 3 and a rear housing 4 between which is disposed a diaphragm 5. The outer peripheral portion of diaphragm 5 is secured to both housings 3 and 4 by a bayonet connection while the inner peripheral portion of diaphragm 5 is air-tightly connected with a power piston 6 whereby front and rear chambers 7 and 8 are defined within the two housings 3 and 4. A coil spring 9 is provided in the front chamber 7 as a return spring for power piston 6.

The power piston 6 has a hollow axial portion 10 extending outwardly through a central bore of the rear housing 4. A rubber or rubber-like seal 11 is provided between the outer periphery of the axial portion 10 of power piston 6 and the inner periphery of the bore of the rear housing 4 so as to maintain air-tightness therebetween. Reference numeral 12 designates a plastic bearing allowing for smooth axial movement of axial portion 10.

An air valve assembly 13 is disposed in the axial portion 10 and is axially slidable therein. Seal member 14 is provided on a part of the air valve assembly 13 to prevent any possible air communication between the two chambers 7 and 8. The right end of the air valve assembly 13 is connected to a rod 15 which is pivotably connected to a brake pedal (not shown).

A control valve assembly 17 is disposed in the axial portion 10 of the power piston 6 and is arranged to be in contact with the air valve assembly 13. The right end of the control valve assembly 17 is secured to a holder 18 which is fixedly secured within a shoulder portion of bore 16 of the axial portion 10. Compression coil spring 20 is provided between the holder 18 and retainer 19 with reference numeral 25 designating an air filter.

The control valve assembly 17 includes a diaphragm portion one end (rear) of which is secured to the holder 18 and the other end (front) of which is free to move in an axial direction. A spring 21 is provided between the holder 18 and the free end of the diaphragm portion to thereby bias the latter toward the left. The inner part of the front surface of the control valve assembly serves as a valve seat for the air valve assembly 13 when in contact with the rear end thereof (the position shown in the drawing) and the outer part of the front surface of the control valve assembly 17 serves as another valve seat when in contact with a shoulder portion 22 provided in the power piston 6.

Passages 23 and 24 are provided in the power piston 6 for communication between two chambers 7 and 8 and the communication is controlled under the operation of air and control valve assemblies 13 and 17. The front chamber 7 is connected to an engine intake manifold (not shown) through a check valve (also not shown).

Reference numeral 27 is an output end of brake booster. One end of the output rod 27 is connected to the power piston 6 through a connecting ring 27a and has a bore in which a rod portion or extension of the air valve assembly 13 is relatively slidably disposed. The other end of the output rod 27 is slidably received in a large diameter portion 28a of cylinder 28 of the master cylinder 2 which is secured to the front housing 3 of the brake booster 1 by means of bolt-and-nut assembly 26. The rod 27 is guided by a support member 30 secured in a rear axial portion 29 of the cylinder 28. A cup seal 31 is provided between the members and the rod 27 to prevent liquid flow into the front chamber 7 of the booster 1. Reference numeral 32 denotes a holder ring which prevents the member 30 from moving.

A rubber or rubber-like reaction disc 33 is secured to a front portion of the output rod 27. The front surface of the disc 33 is in contact with the rear end of a primary piston 34 of the master cylinder 2 and is of the same diameter. A space 35 is provided between the rear surface of the disc 33 and the front end of the rod portion 13a of the air valve assembly 13. Under brake operation, due to the leftward movement of the rod portion 13a, the space 35 will no longer exist and therefore, the disc 33 will be compressed by the rod portion 13a to thereby affect rod 37 of control valve 36 which is disposed in the primary piston 34.

The control valve 36 further includes a spring 40 which continuously biases valve head 36a to a closed position as shown in the FIGURE. A series of passages are provided as relief mechanisms which include passage 43a provided in the cylinder body 28, passage 44a provided in the output rod 27 and communicable with the passage 43a, passage 44 provided in the primary piston 34 and communicable with the passage 41 provided in the rod 37 and communicable with the passage 44. When the valve 36 is opened due to movement of the rod 37, passage 44 communicates with a lower pressure chamber 42 defined between a large diameter portion 28a of the cylinder 28 and the primary piston 34.

The passage 43a communicates with port 43 which is connected to a reservoir (not shown). Reference numeral 39 designates a plug threaded into the primary piston 34 for retaining one end of the spring 40 thereto.

A piston cup 45 is provided on the primary piston 34 and slidable therewith to control communication between an auxiliary port 46 connected to the reservoir port 43 and the lower pressure chamber 42 upon sliding movement.

A free piston or floating piston 47 is disposed in a small diameter portion 28b of the cylinder 28 and is continuously biased to the left by a first spring 48 provided between the left end of the primary piston 34 and a shoulder of the free piston 47. The piston 47 is also biased to right by a second spring 51 provided between a retainer 50 secured in the free piston 47 and a supporting member 49 provided at the left end wall of the small diameter portion 28b of the cylinder 28. Thus the free piston 47 is balanced by the two opposed springs 48 and 51.

Another valve 52 is provided in the spring supporting member 49 and a rod portion 53 of the valve 52 extends through the member 49 to the retainer 50 and is engaged therewith. The valve 52 is biased to left by a spring 54 provided between the member 49 and the valve 52.

A first pressure chamber 55 is provided between the primary piston 34 and the free piston 47 in the small diameter portion 28b of the cylinder 28 and similarly, a second pressure chamber 56 is provided between the free piston 47 and the supporting member 49 in the small diameter portion 28b. The communication of the second pressure chamber 56 with the reservoir is controlled by the operation of the valve 52. In other words, when the valve 52 is opened as shown in the FIGURE, the second pressure chamber 56 communicates with the reservoir through passage 57a and port 57.

A cup seal 58 is provided in a groove 59 and has a tapered inner periphery into which is inserted a head or front end 60 of the primary piston 34. Accordingly, there is provided a space 66 between the piston 34 and the cup seal 58.

The first pressure chamber 55 communicates with the lower pressure chamber 42 through passage 61 provided in the front end 60 of the primary piston 34, space 66 and a space 67 is provided between the outer periphery of the primary piston 34 and the cylinder body 28. This cup seal 58 and passages 61, 66 and 67 serve as a check valve wherein the communication between the two chambers 42 and 55 occurs only when the pressure in the chamber 42 is increased due to the leftward movement of the output rod 27.

Reference numeral 63 designates a passage which communicates with a first wheel brake cylinder (not shown) and reference numeral 64 designates a passage which communicates with a second wheel brake cylinder (also not shown). The FIGURE shows the condition such that no brake is being applied. Under this condition the air valve 13 is seated on the control valve 17 and the control valve 17 is separated from the seat 22 of the power piston 6. Both of the chambers 7 and 8 are in communication with one other through passages 23 and 24. The power piston 6 is biased to the right by the return spring 9. Three chambers 42, 55 and 56 in the master cylinder 2 all communicate with the reservoir; the lower pressure chamber 42 is in communication with the port 43 through auxiliary port 46, the first pressure chamber 55 is in communication with the lower pressure chamber 42 through space 66, passage 61 and slit grooves 62 provided on the plug 39 and the second pressure chamber 56 is in communication with the port 57 through passage 57 and slits 49a provided in supporting member 49. Accordingly, there is no brake pressure in respective wheel brake cylinders which are connected to first and second pressure chambers 55 and 56, respectively, through passages 63 and 64. Under these conditions, when the brake pedal is depressed, connecting rod 15 is moved toward the left to move the air valve 13 to the left. Then the control valve 17 is accordingly moved toward the left by the force of spring 21 until it contacts with the valve seat 22 of the power piston 6 to thereby interrupt communication between the two chambers 7 and 8. Further leftward movement of the air valve 13 with the rod 15 causes the separation of the air valve 13 from the control valve 17 to introduce the air into the rear chamber 8 through air filter 25 and the passage 24.

Due to the pressure difference between the two chambers 7 and 8, the power piston 6 is moved to the left against the biasing force of spring 9 and thus the primary piston 34 of the master cylinder 2 is moved to the left through the movement of rod 27 and the reaction disc 33. The free piston 47 is accordingly moved to the left by the force of the first spring 48 which causes the disengagement of rod 53 from the retainer 50. Due to the free condition of the rod 53 of the valve 52, valve 52 closes the passage 57a by the force of spring 54. Thus communication between the reservoir and the second pressure chamber 56 is interrupted.

At the same time, the cup seal 45 attached on the primary piston 34 is moved to the left so as to close the auxiliary port 46 and interrupt communication of the lower pressure chamber 42 with the reservoir.

Further movement of the rod 27 will cause a pressure increase in the chamber 42 and thus increased pressure is transmitted through space 66, the first pressure chamber 55, and the passage 63 to the first wheel brake cylinder. Similarly, the pressure in the second pressure chamber 56 is increased due to the leftward movement of the free piston 47 and is then transmitted to the second wheel brake cylinder through passage 64. At this stage, the force of brake booster 1 caused by the depression of brake pedal contributes to the pressure increase in the chambers 42, 55 and 56.

When the force of pedal depression reaches a predetermined value, the pressure in the lower pressure chamber 42 is reduced to atmospheric pressure level and, later on, the force generated by the brake booster 1 contributes exclusively to the two chambers 55 and 56. In other words, during braking operation, due to the leftward movement of the rod 13a, the space 35 between the rod 13a and the reaction disc 33 no longer exists and the reaction disc 33 is compressed between the rods 27 and 13a and the primary piston 34. This means that the reaction disc 33 has an internal stress (pressure) in response to the force of the pedal depression. This internal pressure will act on the rod 15 as a reaction force as well as acting on the right end of the rod 37 of control valve 36 to open the same against the force of spring 40. When the valve 36 is opened, the pressure in the lower pressure chamber 42 is relieved from the passages 41, 44 and 43a to the reservoir to thereby reduce the pressure in the chamber 42 to atmospheric pressure level. Accordingly, the force generated by the brake booster 1 is applied exclusively to the chambers 55 and 56 to increase the pressure therein.

Upon release of the brake pedal, power piston 6 returns by the force of spring 9 to its original position shown in the FIGURE and primary piston 34 also returns to its original position by the force of springs 48 and 51.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A brake master cylinder with an attached brake booster for communication with at least one wheel brake cylinder and with a reservoir comprising:
    a master cylinder body,
    a booster housing connected to said master cylinder body;
    a power piston positioned in said booster housing and dividing said housing into first and second chambers;
    a first valve mechanism mounted in said power piston wherein said first valve mechanism further comprises a brake pedal, a control valve and an air valve operatively connected to said brake pedal, said control valve being operable with said air valve and said first valve mechanism generating pressure differences between said first and second chambers in accordance with brake pedal depression force;
    a hollow output member having a shoulder portion and a first end thereof being connected to said power piston and a second end thereof being slidably mounted in said master cylinder body;
    a primary piston, a first end thereof being slidably mounted in said second end of said output member and a second end of said primary piston being slidably mounted in said master cylinder body;
    a first hydraulic pressure chamber formed within said master cylinder body by said output member and said primary piston;
    a second hydraulic pressure chamber formed within said master cylinder body by said primary piston;
    a rod member unitarily formed with said air valve of said first valve mechanism, said rod member extending through said output member toward said primary piston;
    a resilient member disposed in said shoulder portion of said hollow output member between said first end of said primary piston and a first end of said rod member for transmitting force to said primary piston;
    first passage means for continuously communicating said second hydraulic chamber with said at least one wheel brake cylinder;
    second passage means for communicating said first hydraulic chamber with said reservoir;
    a second valve mechanism for opening said second passage means to establish communication between said first hydraulic chamber and said reservoir when said output member is positioned in a rest position and for closing said second passage means when said output member is moved to an active position;
    third passage means for connecting said second hydraulic pressure chamber with said first hydraulic pressure chamber;
    a third valve mechanism for opening said third passage means to establish communication between said first and second hydraulic pressure chambers when said primary piston is in a rest position and for closing said third passage when said primary piston is moved to an active position;
    a check valve mechanism for allowing fluid flow from said first hydraulic pressure chamber to said second hydraulic pressure chamber upon said third passage means being closed;
    fourth passage means provided in said primary piston for connecting said first hydraulic pressure chamber with said reservoir upon said second passage means being closed; and
    a fourth valve mechanism mounted in said primary piston for controlling communication of said fourth passage means, wherein said fourth valve mechanism further comprises a rod portion extending through said primary piston toward said resilient member, a first end of said rod portion contacting with said resilient member and a spring loaded valve head for closing said fourth passage means such that said fourth valve mechanism is seated only by the force of said resilient member and is unseated by the internal pressure generated in said resilient member.

2. A brake master cylinder as set forth in claim 1, wherein said fourth passage means includes passage means extending through said rod portion of said fourth valve mechanism and said spring loaded valve head.

3. A brake master cylinder as set forth in claim 1, wherein said check valve mechanism further comprises:
    a cup seal provided on said master cylinder body and slidable on an outer surface of said primary piston;
    a passage formed by said outer surface of said primary piston and an inner surface portion of both said master cylinder body and said cup seal; and
    said fourth passage means provided in said primary piston.

* * * * *